United States Patent [19]

Atkins

[11] Patent Number: 5,637,630
[45] Date of Patent: Jun. 10, 1997

[54] COMPOSITION OF UNSATURATED POLYESTER, COPOLYMERIZABLE MONOMER AND POLY (VINYL ETHER) SHRINKAGE CONTROL AGENT

[75] Inventor: Kenneth E. Atkins, South Charleston, W. Va.

[73] Assignee: Union Carbide Chemicals & Plastics Technology Corporation, Danbury, Conn.

[21] Appl. No.: 799,727

[22] Filed: Nov. 22, 1991

Related U.S. Application Data

[63] Continuation of Ser. No. 331,696, Mar. 31, 1989, abandoned.

[51] Int. Cl.$^6$ .................................. C08L 67/06; C08K 7/14
[52] U.S. Cl. ........................... 523/523; 523/512; 523/521; 525/166; 525/168
[58] Field of Search .................................. 525/108, 168, 525/166; 527/539; 523/466, 468, 512, 523, 521

[56] References Cited

U.S. PATENT DOCUMENTS

| | | | |
|---|---|---|---|
| Re. 31,975 | 8/1985 | Comstock et al. | 523/514 |
| 3,489,707 | 1/1970 | Fry | 260/31.6 |
| 3,503,921 | 3/1970 | Souza, Jr. et al. | 260/40 |
| 3,549,586 | 12/1970 | Smith et al. | 260/40 |
| 3,665,055 | 5/1972 | Hatton, Jr. et al. | 260/862 |
| 3,668,178 | 6/1972 | Comstock et al. | 260/40 |
| 3,701,748 | 10/1972 | Kroeckel | 260/40 |
| 3,718,714 | 2/1973 | Comstock et al. | 260/862 |
| 3,721,722 | 3/1973 | Baum | 260/862 |
| 3,725,335 | 4/1973 | Lefebvre | 525/447 |
| 3,736,278 | 5/1973 | Wada et al. | 260/22 |
| 3,772,241 | 11/1973 | Kroeckel | 260/40 |
| 3,842,142 | 10/1974 | Harpold et al. | 260/862 |
| 3,883,612 | 5/1975 | Pratt et al. | 260/862 |
| 3,887,515 | 6/1975 | Pennington et al. | 260/836 |
| 3,909,483 | 9/1975 | Hindersinn et al. | 260/40 |
| 3,923,928 | 12/1975 | Atkins et al. | 260/865 |
| 3,929,868 | 12/1975 | Dombroski et al. | 260/475 |
| 3,933,757 | 1/1976 | Pratt et al. | 260/75 |
| 3,988,388 | 10/1976 | Alberts et al. | 260/862 |
| 3,994,853 | 11/1976 | Hindersinn et al. | 260/40 |
| 4,020,036 | 4/1977 | South, Jr. | 260/40 |
| 4,032,484 | 6/1977 | Gentry | 260/29.1 |
| 4,035,439 | 7/1977 | Stevenson | 260/859 |
| 4,101,604 | 7/1978 | Rowe | 260/862 |
| 4,160,759 | 7/1979 | Gardner et al. | 260/40 |
| 4,161,471 | 7/1979 | Kassal | 525/168 |
| 4,170,612 | 10/1979 | Pastor et al. | 525/445 |
| 4,172,059 | 10/1979 | Atkins et al. | 260/22 |
| 4,263,199 | 4/1981 | Atkins | 260/40 |
| 4,284,736 | 8/1981 | Comstock et al. | 525/169 |
| 4,374,215 | 2/1983 | Atkins | 525/168 |
| 4,421,894 | 12/1983 | O'Connor et al. | 525/28 |
| 4,491,642 | 1/1985 | Atkins | 523/515 |
| 4,525,498 | 6/1985 | Atkins et al. | 523/511 |
| 4,535,110 | 8/1985 | Istere et al. | 524/196 |
| 4,555,534 | 11/1985 | Atkins | 523/507 |
| 4,673,706 | 6/1987 | Atkins | 525/31 |
| 4,678,711 | 7/1987 | Atkins et al. | 428/414 |

FOREIGN PATENT DOCUMENTS

| | | |
|---|---|---|
| 849135 | 7/1977 | Belgium . |
| 74746 | 9/1981 | European Pat. Off. . |
| WO9001512 | 2/1990 | European Pat. Off. . |
| 1137834 | 6/1957 | France . |
| 2152516 | 4/1972 | France . |
| 46-36462 | 10/1971 | Japan . |
| 0937703 | 9/1963 | United Kingdom . |
| 937703 | 9/1963 | United Kingdom . |
| 1361841 | 7/1974 | United Kingdom . |

OTHER PUBLICATIONS

6001, Chemical Abstracts vol. 77, No. 12, 18, Sep. 1972, Columbus, Ohio, USA JP-A-7136462 (Showa Kobunshi Co Ltd) 26 Oct 1971; Ref. No. 76144K.

*Primary Examiner*—Robert E. Sellers
*Attorney, Agent, or Firm*—W. K. Volles

[57] ABSTRACT

A molding composition comprises a) an unsaturated polyester resin, b) a copolymerizable olefinically unsaturated monomer, c) a pigment, d) fiber reinforcement and e) a poly(vinyl ether) polymer with a weight average molecular weight of at least 50,000 to control shrinkage and promote the uniform distribution of the pigment in the molding composition.

13 Claims, 1 Drawing Sheet

COMPOSITION OF UNSATURATED POLYESTER, COPOLYMERIZABLE MONOMER AND POLY (VINYL ETHER) SHRINKAGE CONTROL AGENT

This application is a continuation of prior U.S. application Ser. No. 331,696 filed Mar. 31, 1989, now abandoned.

BACKGROUND OF THE INVENTION

1. Field of the Invention

Unsaturated polyester resins are widely employed commercially in a variety of reinforced fabrication systems including among others matched metal-die compression, transfer, pultrusion and injection molding. These systems involve curing a formulated compound at high temperatures and pressures in hardened and chrome plated molds. These methods provide the highest volume and highest part uniformity of any thermoset molding technique.

For the purposes of the descriptions dealt with herein, these resins are characterized in terms of systems containing them, and the systems encompass the following types:

1. Resin systems free of reinforcement. This is a resin system utilizes a thermosettable resin that is designed to be used as such or with reinforcement at the high temperatures and pressures utilized in a variety of reinforced fabrication systems including among others matched metal-die compression, transfer, pultrusion and injection molding. When the term "resin system" is used herein, such contemplates a composition using a thermosettable resin that is free of reinforcement, fibrous or non-fibrous, unless it is specifically indicated to contain reinforcement as contemplated in the definitions which follow.

2. "Reinforced resin system" is a resin system in which there is provided a sufficient amount of one or more of fibrous or non-fibrous materials as reinforcing agents that make a positive contribution to the physical properties of the molded product derived from the reinforced resin system.

3. "Non-fiber reinforced resin" system is a resin system in which there is provided a sufficient mount of one or more non-fibrous materials as reinforcing agents that make a positive contribution to the physical properties of the molded product derived from the non-fiber reinforced resin system. A non-fiber reinforced resin system is free of reinforcing mounts of a fiber.

4. "Fiber reinforced resin system" is a resin system in which there is provided a sufficient mount of one or more fibers as reinforcing agents that make a positive contribution to the physical properties of the molded product derived from the fiber reinforced resin system. A fiber reinforced resin system contemplates the optional presence of non-fiber reinforcing agent(s).

2. Background to the Field of the Invention

British patent specification 937,703, published Sep. 25, 1963, in characterizing the prior art, describes a casting resin in the following language:

"For the same purpose, it is also known to employ as casting resin a mixture of unsaturated polyesters with a high percentage solution of one or more thermoplastic polymers, such as polystyrene, polyvinyl ether and polyisobutylene in styrene."

The British specification is not dear as to the relationship of this casting resin to the molding procedure recited in the preceding paragraph, which reads as follows:

"It is also known, for the manufacture of dimensionally accurate moulded elements from unsaturated polyesters and polymerisable compounds, for a portion of the materials first of all to be completely polymerised outside the mould, for the resulting polymers to be comminuted and for the small particles thus obtained to be introduced into the mould. The cavities between the particles are then filled by a liquid mixture of the same components and this mixture is thereafter polymerised."

This British patent specification fails to depict reinforced resin systems, especially fiber reinforced resin systems, the predominant direction of the unsaturated polyester molding resin art. Since the date of this specification, a complex art relating to the molding of unsaturated polyester resins with reinforcing fibers has developed. This art has emerged to a level of significant commercial proportions with many commercial items being made by molding, as contrasted to casting, of unsaturated polyester resins in combination with reinforcing fibers which are part of complex systems. The specifications that have emerged for such unsaturated polyester resin systems so significantly transcend the early developments in the art of molding, as reflected by the British specification, that little relationship between that work and today's technical demands exists.

One technical improvement that has made a significant contribution to commercial unsaturated polyester fiber reinforced molding technology is the use of low profile additives to reduce shrinkage during the curing reaction and to thereby improve dimensional stability and surface smoothness (through good mold reproduction). Low profile additives are typically described as thermoplastic polymers such as vinyl acetate polymers, acrylic polymers, polystyrene, saturated polyesters, polycaprolactones, polyurethanes, cellulose acetate butyrate, polyalkylene oxides, and others. However, the most significant of them are the vinyl acetate polymers and the acrylic polymers.

References are made to the following United States Patents as examples of this technology: U.S. Pat. Nos. 3,718,714; 3,549,586; 3,668,178; 4,284,736; 3,701,748; 3,772,241; 3,503,921; 3,736,728; 3,489,707; 3,988,388; 3,665,055; 4,491,642; 4,374,215; 4,525,498; and 4,555,534.

There are a number of theories that seek to explain the low profile or anti-shrinkage action of these polymers, but the one that seems to best explain the phenomenon is the following:.

The low profile additive is at least partly soluble in the uncured thermosetting resin such as a polyester/styrene solution. As the polyester/styrene mixture crosslinks, the thermoplastic polymer becomes incompatible or less soluble and at least partly comes out of solution. This action causes a volume expansion that compensates for the shrinkage that occurs when the polyester/styrene mixture crosslinks.

A major advance in commercial thermosetting molding technology was the introduction a number of years ago of chemically thickened systems. Chemical thickening is always employed in sheet molding compounds ("SMC"), and is increasingly being used in bulk molding compounds ("BMC"). In such systems, an alkaline material such as magnesium oxide or magnesium hydroxide is added to, for example, an uncured polyester along with fillers, glass fiber, and other standard materials. The alkaline material interacts with residual acidity in the polyester to build viscosity. The thickened system is relatively tack free and easy to handle, and the high viscosity carries the glass fiber reinforcement to the extremities of the mold during crosslinking of the system. Thus, the use of thickened systems has made a major contribution to the commercial expansion of polyester molding.

However, there are cases where chemical thickening is undesirable because it reduces the shelf life of the molding compound or because various molding techniques such as injection molding can be sensitive to viscosity changes in the molding material.

For all of the advancements in low shrink or low profile molding technology one problem has defied an optimum solution. That is the uneven distribution of pigment when the molding compound is cured resulting in a non-uniform, lightened and "marbled" appearance which is unacceptable for many applications. To be able to achieve this color uniformity could preclude having to paint some parts molded from these materials and would also make the utility of these molding materials possible in other applications.

The history of the study of this problem has shown:
1. Reasonable pigment uniformity can be obtained with shrinkage control materials such as polystyrene and polyethylene but only fair shrinkage control can be achieved; e.g., no better than 1.0–1.5 mils/inch shrinkage.
2. Acceptable pigment uniformity cannot be obtained with the very good shrinkage control materials such as the vinyl acetate or acrylate polymers.
3. With a special vinyl acetate—maleic acid copolymer using surface active agents in chemically thickened systems (see U.S. Pat. No. 4,555,534), progress was made towards the goal of very good shrinkage control and uniform pigmentation but in a restricted area.

No general polymer type has been identified that can combine the excellent shrinkage control properties and uniform pigmentation, particularly across chemically thickened and unthickened formulations.

THE INVENTION

It has been found, quite surprisingly, that polyester molding compositions meeting the above described needs of excellent shrinkage control and uniform pigmentation across chemically thickened and unthickened systems is obtainable by utilizing poly(vinyl ether) as the low profile additive. The compositions of the invention comprise:
a. an unsaturated polyester resin,
b. an olefinically unsaturated monomer that is copolymerizable with said unsaturated polyester resin,
c. fiber reinforcement, and
d. a poly(vinyl ether) polymer to control shrinkage.

DETAILED DESCRIPTION OF THE INVENTION

Figure 1:
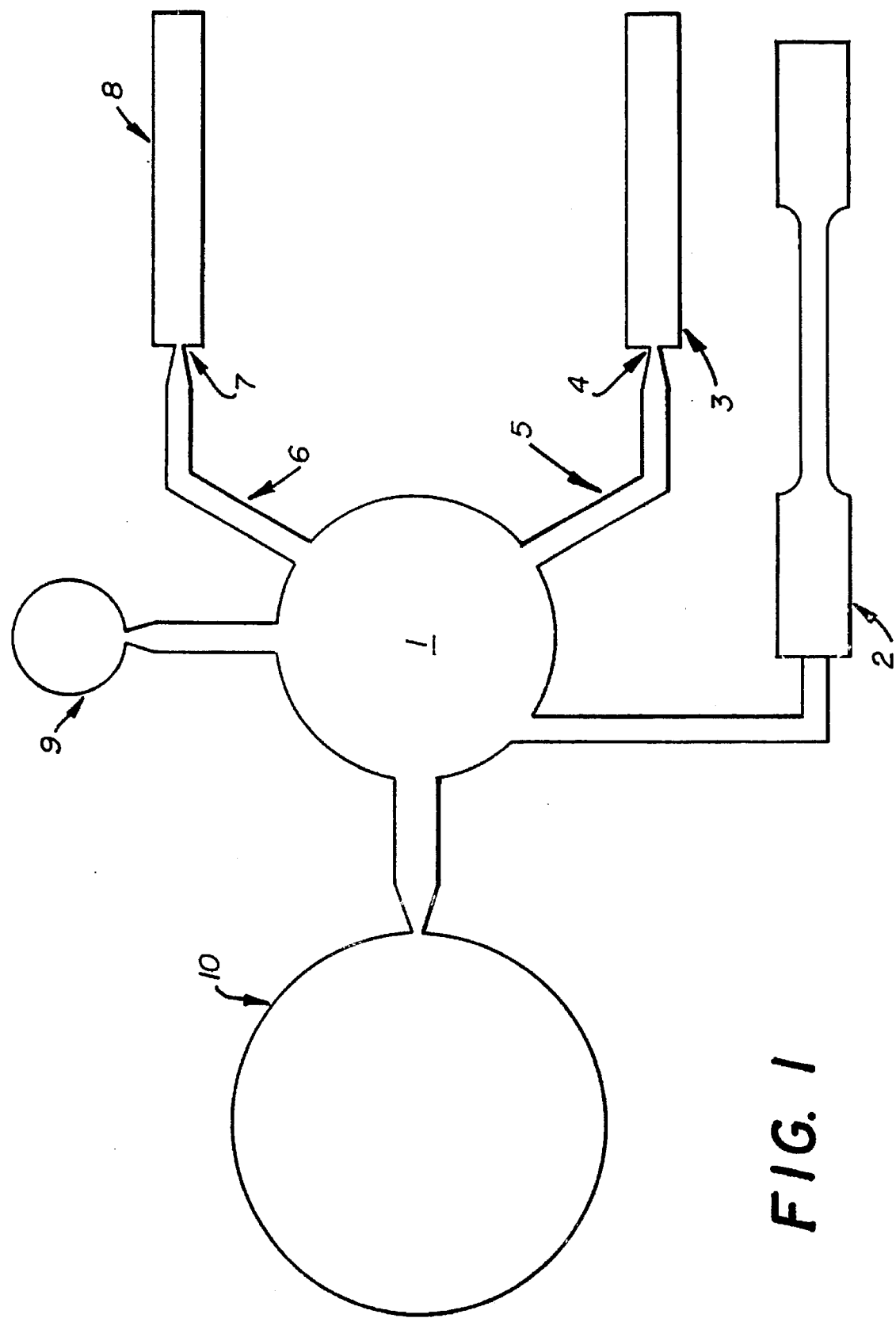

The invention is concerned with an improvement in thermosetting resin molding compositions and additive compositions which may be employed in making effective pigmentable thermosetting resin molding compositions. The invention contemplates molding compositions suitable for compression, casting, transfer, injection, pultrusion, vacuum forming, and the like, molding techniques. The invention is directed to thermoset molding systems possessing enhanced flow characteristics and surface control, but in particular, molding systems possessing unique pigmentability and excellent shrinkage control. The invention provides unique compositions and methods for making molding compositions and molded products that provide low shrink, curable, fiber reinforced molding compositions that can be used to generate molded parts at high temperature molding conditions which possess exceptional surface smoothness with increased physical properties, particularly uniform pigmentability even when the molded article contains fiber reinforcement.

The invention contemplates the use of resin systems that allows the combination of poly(vinyl ether) low profile additives with a variety of thermosetting resins, that is, resins that cure by crosslinking through functional groups in the polymeric resin. The greatest proportion of the resin systems employ unsaturated polyester resins. Other resins include, e.g., phenolic resins, epoxy resins, urethane resins, and the like.

Thermosetting Resins

Thermosetting polyester resins preferably used in the practice of the invention are polyester resins that are reaction products of a dicarboxylic acid or anhydride, with a polyhydric alcohol. The dicarboxylic acids or anhydrides that are employed to produce the polyester, either singly or in combination, include those that contain olefinic unsaturation, preferably wherein the olefinic unsaturation is alpha, beta- to at least one of the carboxylic acid groups. Such acids include maleic acid or anhydride, fumaric acid, methyl maleic acid, and itaconic acid. Maleic acid or anhydride and fumaric acid are the most widely used commercially.

In addition to the olefinically unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane. As a rule, not more than about 20 mole percent of the polyol will be a triol, with the remainder being one or mere diols.

As is known in the art, polyesters that are employed in thickened molding compositions should contain residual acidity in order to enter into the thickening reaction. The nature and production of the polyesters used in such applications, such as diicyclopentadiene modified resins, are known in the art and are described in U.S. Pat. Nos. 3,933,757 and 3,883,612 incorporated herein by reference.

Vinyl ester resins that have been advantageously employed in both bulk molding compounds (BMC) and sheet molding compounds (SMC) are resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl.

Thermosetting resins that are classified herein as vinyl ester resins, which contain the characteristic linkages and terminal, polymerizable unsaturated groups are disclosed in U.S. Pat. No. 3,887,515, to Pennington, et al., along with the preparation of such resins.

Crosslinkable Monomers

The resin systems of the invention employ low viscosity crosslinking monomers. Where the resin is an unsaturated polyester or vinyl ester, it is preferred that the monomers contain ethylenic unsaturation such that the monomer is copolymerizable with the polyester and terminally unsaturated vinyl ester resins. Useful monomers include monostyrene, alkyl acrylates and methacrylates such as $C_{1-12}$ alkyl acrylates and methacrylates, substituted styrenes such as α-methyl styrene, α-chlorostyrene, 4-methylstyrene, and the like, divinylbenzene, acrylonitrile, methacrylonitrile, and the like. Styrene is the preferred monomer in commercial practice today, although others can be used.

The low viscosity crosslinking monomer is also employed in the resin composition (the thermosetting resin may be a solid at ambient temperatures, i.e., about 20°–25° C.) to dissolve the resin thereby ensuring that the resin composition is a fluid. In this case, the monomer acts as a reactive diluent. Enough monomer is employed so that the viscosity of the fluid is at a convenient level for processing. Excessive amounts of the monomer should be avoided because an excess can have an adverse effect on the cured resin's properties. For example, too much monomer tends to cause embrittlement of the cured polyester. With these guidelines, effective proportions of the monomer are normally found within the range of from about 25 to about 70, and preferably 40 to 55, weight percent, based on weight of thermosetting polyester resin plus monomer and thermoplastic additive.

Low Profile Additive

The poly(vinyl ether) polymers of this invention included poly(vinyl ethyl ether), poly(methyl vinyl ether), polyvinyl (isobutyl ether), as well as vinyl ether polymers of higher alkyl and various aryl derivatives. These polymers can also include copolymers, terpolymers, etc. of various vinyl ether monomers with other monomers with which they are reactive. These vinyl ether polymers can either be used alone as the low profile additive or can be mixed with other known low profile additives to provide desirable properties to these compositions. Molecular weights of these poly(vinyl ethers) can vary broadly from 50,000 to over 3,000,000.

The poly(vinyl ether) polymer usable in the practice of the invention concern homopolymers and copolymers possessing repeating units of the formula

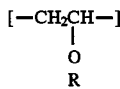

wherein R may be one or more of alkyl of 1 to about 18 carbon atoms, cycloalkyl of 3 to 8 ring carbon atoms, phenyl, alkcycloalkyl possessing 1 to about 8 carbon atoms in the alkyl moiety thereof, alkphenyl possessing 1 to about 8 carbon atoms in the alkyl moieties thereof, and the like. The poly(vinyl ether) polymer may be a copolymer of the formula

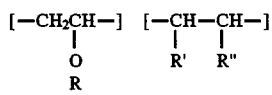

wherein each R' and R" may be hydrogen and organo, such as alkyl of from 1 to about 12 carbon atoms, phenyl, acyloxy, alkoxycarbonyl, hydroxyalkoxycarbonyl, oxy, hydroxy, carboxylic, and the like. The preferred copolymer contains at least 50 mole percent of vinyl ether moieties of the formula

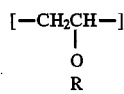

in the polymer backbone, the remainder being other repeating units.

Functional moieties such as carboxyl and hydroxyl groups may be introduced into these polymers by a variety of methods. These moieties could present advantages in chemically thickened systems. For example, the poly(vinyl ether) may be made by the copolymerization of a vinyl ether monomer of the formula $$CH_2=CHOR$$

with a functional monomer of the formula

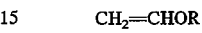

wherein $R_a$, $R_b$, $R_c$ and $R_d$ may each be one or more of alkyl (preferably from 1 to about 4 carbon atoms) or phenyl, and at least one of $R_a$, $R_b$, $R_c$ and $R_d$ is a functional group capable of reaction with a thickening agent or a hydroxyl or carboxyl group in the resin system, and may include one or more or the following groups:

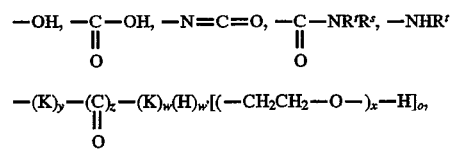

wherein w, y and z may be 0 or 1, w' has a value equal to the free valence of K less the value of o and o has a value of 0 to a value equal to the free valence of K and x may be at least 1, so as to form one or more of a carbonate, carboxyl, oxycarbonyl, carbamate, urea, ether, the sulfur analogs, and the like; K is one of oxygen, sulfur or nitrogen, and $R^r$ and $R^s$ may each be one or more of alkyl (preferably from 1 to about 4 carbon atoms), phenyl, or $$-(-CH_2CH_2-O-)_x-H$$

The functional monomer may be incorporated into the copolymer by conventional bulk, solution or emulsion free radical or ionic polymerization. Illustrative of such functional monomers are, e.g., ethylenically unsaturated carboxylic acids, such as acrylic acid, methacrylic acid, crotonic acid, maleic acid, fumaric acid, itaconic acid, and the like, or anhydrides such as maleic anhydride, and the like, vinyl alkanoates which can be copolymerized and then hydrolyzed to form the —OH group along the backbone, such as vinyl formate, vinyl acetate, vinyl butyrate, and the like, alkenyl isocyanate such as vinylisocyanate, allylisocyanate, the one to one molar reaction product of toluene diisocyanate and allyl alcohol, and the like; alkenyl amines such as allyl amine, and the like.

In addition, a poly(vinyl ether) polymer may be subjected to a transetherification reaction to substitute a functional group as a pendant reactive group. For example, an ether compound of the formula

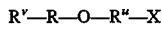

wherein X is a functional group such as —OH, —COOH, —O—CO—OH, and the like, which can be reacted with a poly(vinyl ether) to substitute small mounts of functionality that is reactable with thickening agents so as to assist the interreactability of the low profile additive with the thickening agent and the polyester resin. Transetherification is typically carded in a solvent solution of the poly(vinyl ether) and the functional monomer at elevated temperatures generally greater than 100° C. and commonly less than 200° C.

A preferred embodiment of the invention includes a poly(vinyl ether) polymer containing a small mount of such functionality in the polymer structure, typically not more than 10 weight percent of the weight of the poly(vinyl ether) low profile additive. Generally, the functionality will comprise, when it is present, at least 0.25 weight percent of the weight of the poly(vinyl ether) low profile additive.

The amount of the exemplified poly(vinyl ethers) typically contemplated in the resin systems of this invention are from 1-25 percent based on the weight of unsaturated polyester resin, low profile additive and crosslinkable monomer, such as styrene, in the resin system. The most preferred range is from 4-18 percent.

Optional Ingredients

The invention also contemplates the use of other more conventional low profile additives in admixture with the poly(vinyl ether) low profile additive of the invention. Such mixtures will typically include the poly(vinyl ether) low profile additive as the predominant, in terms of weight of low profile additive in the resin system, low profile additive in the resin system. Preferably, the amount by weight of the poly(vinyl ether) low profile additive in the resin system relative to the amount of other low profile additive in the resin system of the invention, is generally in a ratio of greater than about 0.3/1, preferably greater than about 1.2/1, and most preferably greater than about 1.5/1. A wide variety of other low profile additives may be employed in the resin system, especially in the fiber reinforced resin system of the invention. It is to be appreciated that the presence of these other low profile additives will adversely affect the degree of good pigmentability of the molded composition, i.e., the resin system, the fiber reinforced resin system.

For example, the other low profile additive may be the thermoplastic polymers of vinyl acetate, saturated thermoplastic polyesters, mixtures of the same. In another aspect of the invention, the other low profile additives may be thermoplastic polyalkyl methacrylate polymers. In still other aspects of the invention, the other thermoplastic low profile additives may be such materials as polyurethanes, styrene-butadiene, polystyrene, and similarly used materials.

Suitable thermoplastic vinyl acetate polymer low profile additives are poly(vinyl acetates) homopolymers and thermoplastic copolymers containing at least 50 weight percent vinyl acetate. Such polymers include, for example, vinyl acetate homopolymer, carboxylated vinyl acetate polymers including copolymers of vinyl acetate and ethylenically unsaturated carboxylic acids, such as acrylic acid, methacrylic acid, crotonic acid, maleic acid, fumaric acid, itaconic acid, and the like, or anhydrides such as maleic anhydride, vinyl acetate/vinyl chloride/maleic acid terpolymers, and the like. Reference is made to U.S. Pat. No. 3,718,714 to Comstock, et al, and British Pat. No. 1,361,841 to Comstock, et al. for descriptions of some of the suitable vinyl acetate polymer low profile additives.

The useful vinyl acetate polymer low profile additives ordinarily have molecular weights within the range of from about 10,000 to about 250,000 and preferably from about 25,000 to about 175,000. They are usually employed in proportions of from about 5 to 25, and preferable from about 9 to 16, weight percent, based on weight of polyester plus thermoplastic, plus monomer.

Suitable thermoplastic saturated polyester low profile additives are, in general, low molecular weight saturated polymers of polymerizable linear and/or cyclic esters and carboxylated saturated polymers of said polymerizable esters having at least one carboxyl group per molecule.

Polymers of linear and/or cyclic esters, including carboxylated polymers having an average of at least one carboxyl group per molecule which may be used in accordance with the present invention are those which possess a reduced viscosity of at least about 0.1, and preferably from about 0.15 to about 15 and higher. The preferred polymers of cyclic esters have a reduced viscosity of about 0.2 to about 10.

Suitable polymers are further characterized by the following basic recurring structural Unit I

UNIT I —[—O—(—CRR—)(—A—)(—CRR—)—CO—]—

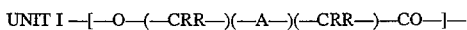

each R, which can be the same or different, is hydrogen, halogen, i.e. chlorine, bromine, iodine, or fluorine, or a monovalent hydrocarbon radical generally containing a maximum of 12 carbon atoms, and preferably containing a maximum of eight carbon atoms. A is an oxy (—O—) group; x is an integer having a value of 1 to 4 inclusive, y is an integer having a value of 1 to 4 inclusive, z is an integer having a value of 0 or 1, with the proviso that (a) the sum of x+y+z is 4 to 6 inclusive and (b) the total number of R variables which are substituents other than hydrogen does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexyl, n-dodecyl, chloroethyl, chloropropyl and the like; alkoxy radicals such as t-methoxy, ethoxy, n-propoxy, n-hexoxy, n-dodecoxy and the like; aryl radicals such as phenyl, ethyl phenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl, and the like.

In one embodiment, desirable polymers of cyclic esters are characterized by both basic recurring structural Unit I supra and basic recurring structural Unit II, as are obtained from a mixture containing a cyclic ester and a cyclic monomer such as ethylene oxide, propylene oxide and the like.

UNIT II —[—O—CHR'—CHR'—]—

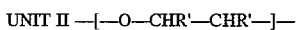

wherein each R', is defined for R of Unit I, or in which the two R' variables together with the ethylene moiety of the oxyethylene chain of Unit II from a saturated cycloaliphatic hydrocarbon ring having from four to eight carbon atoms inclusive. It is referred that recurring Unit II contains from two to twelve carbon atoms inclusive. The interconnection of Unit I and the Unit II does not involve or result in the direct bonding of two oxy groups i.e., —O—O—.

Particularly preferred polymers of cyclic esters are those which are characterized by the oxypentamethylenecarbonyl chain as seen in basic recurring structural Unit III

UNIT III —[—O—(—CR$_1$R$_1$—)$_5$—CO—]—

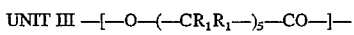

wherein each R$_1$ is hydrogen or lower alkyl, that is, alkyl having a maximum of 4 carbon atoms, with the proviso that no more than three R$_1$ variables are substituents other than hydrogen.

Thermoplastic saturated polymers of linear and/or cyclic esters are well known and the carboxylated saturated esters are well known and such thermoplastic saturated polymers, and particularly polymers prepared from epsilon-caprolactones, have been advantageously employed as low profile additives. Reference, for example, is made to U.S. Pat. Nos. 3,549,586 and 3,668,178 to Comstock et al. for descriptions of thermoplastic saturated polyester low profile additives and carboxylated thermoplastic saturated polyester low profile additives prepared from cyclic esters.

Also included are thermoplastic, saturated polyesters based on saturated (i.e., free of olefinic unsaturation that is reactive with the resin in the molding application) dicarboxylic acids, such as adipic acid, isophthalic acid, terephthalic acid, and the like, and organic diols, such as ethylene glycol, diethylene glycol, neopentyl glycol, 1,6-hexanediol, and the like. These polyesters are described in, for example, U.S. Pat. Nos. 3,909,483; 3,994,853; 3,736,278; and 3,929,868.

Thermoplastic urethanes are useful low pressure additives, alone or in admixture with other low pressure additives, and examples of them can be found in U.S. Pat. No. 4,035,439, patented Oct. 17, 1975, EP 74 746, published Sep. 3, 1981, and U.S. Pat. Nos. 4,421,894, patented Mar. 2, 1979.

The thermoplastic saturated polyester low profile additives may usually be employed in the compositions of the invention in proportions similar to those of thermoplastic vinyl acetate polymers, i.e., in proportions from about 5 to 25 weight percent, and preferably from about 10 to 20 weight percent, based on the weight of polyester, thermoplastic polymer and crosslinkable monomer.

Also suitable in certain aspects of the invention are thermoplastic polymeric alkyl acrylates or methacrylates low profile additives including, for example, homopolymers of methyl methacrylate, ethyl methacrylate, butyl methacrylate, methyl acrylate, ethyl acrylate; copolymer of methyl methacrylate and lower alkyl esters of acrylic and methacrylic acids, and copolymers of methyl methacrylate with minor amounts of one or more of the following. lauroyl methacrylate, isobornyl methacrylate, acrylamide, hydroxyethyl methacrylate, styrene, 2-ethylhexyl acrylate, acrylonitrile, and methacrylic acid. Other useful thermoplastics for the low profile additive function include polystyrene, styrene copolymers, such as styrene/butadiene copolymers, cellulose acetate butyrate, alkylene oxide polymers, and the like.

Molecular weight of the alkyl acrylate or methacrylate polymers useful in the invention may vary over a wide range from 10,000 to 1,000,000, and preferably from 25,000 to 500,000.

The thermoplastic acrylate or methacrylate polymers should be present in amounts ranging from 1 to 25 percent by weight, based on the weight of polyester, low profile additive and crosslinking monomer, and preferably from 5 to 20 percent by weight.

Another optional component of the compositions of the invention is a viscosity reducing agent. In one aspect, the invention employs in combination with thermoplastic vinyl ether polymer, a viscosity reducing agent which is an aliphatic monocarboxylic acid having at least 6 carbon atoms.

The aliphatic monocarboxylic acid viscosity reducing agent employed usually has at least 6 carbon atoms in the chain, and is frequently a saturated or unsaturated fatty acid having from 6 to 24 or more carbon atoms in the chain. Such carboxylic acids may be caproic (hexanoic), caprylic (octanoic), captic ($C_{10}$), lauric ($C_{14}$), palmitic ($C_{16}$), palmitoleic ($C_{16}$), stearic ($C_{18}$), oleic ($C_{18}$), linoleic ($C_{18}$), and the like acids, and the acids may be either straight chain or branched chain. Products in which mixtures of acids of the foregoing kind occur, such as tall oil acid, may be used.

The viscosity reducing agent can be present in amounts ranging from 0.4 to about 6 weight percent, and preferably from about 1 to 4 weight percent, based on the combined weight of thermosetting resin, copolymerizable monomer and low profile additive.

When desired a thickening agent can also be employed in the compositions of the invention. Such materials are known in the art, and include the oxides and hydroxides of the metals of Group I, II and III of the Periodic Table. Illustrative examples of the thickening agents include magnesium oxide, calcium oxide, calcium hydroxide, zinc oxide, barium oxide, magnesium hydroxide, and the like, including mixtures of the same. Thickening agents are normally employed in proportions of from about 0.1 to about 6 weight percent, based upon weight of polyester resin, plus monomer, plus low profile additive.

Alternatively, a dual thickening system maybe employed wherein, for example, a metallic oxide or hydroxide and polyisocyanate in amounts of polyisocyanate sufficient to react with at least thirty percent of the hydroxyl groups but not more than one hundred and five percent of the hydroxyl groups present and an amount of metallic oxide or hydroxide sufficient to react with at least thirty percent of the carboxyl groups but not more than seventy-five percent of the carboxyl groups present. Reference is made to the Belgium Patent No. 849,135 for a description of such dual thickening systems. Other illustrations can be found in U.S. Pat. No. 4,535,110 issued Aug. 13, 1985. In addition to combining with polymeric low profile additives these materials are also effective when these low profile polymers are used in the presence of other shrinkage control additives.

The polyester molding compositions may also contain one or more of the known types of conventional additives, which are employed for their known purposes in the usual amounts. The following are illustrative of such additives:

1. Polymerization initiators such as t-butyl hydroperoxide, t-butyl perbenzoate, benzoyl peroxide, t-butyl peroctoate, methyl ethyl ketone peroxide, and others know to the art. The polymerization initiator is employed in a catalytically effective amount, such as from about 0.3 to about 2 to 3 weight percent, based on the weight of the polyester plus monomer plus low profile additive;
2. Fillers such as clay, hydrate alumina silica, calcium carbonate and others known to the art;
3. Reinforcing fillers such as glass fibers or fabrics, carbon fibers and fabrics, aramide fibers and fabrics, asbestos fibers or fabrics, polypropylene, acrylonitrile/vinyl chloride copolymers, PAN fibers and fabrics;
4. Mold release agents or lubricants, such as zinc stearate, calcium stearate, calcium stearate, and others known to the art; and
5. Rubbers or elastomers such as:
   a. homopolymers or copolymers of conjugated dienes have a weight average molecular weight of 30,000 to 400,000 or higher as described in U.S. Pat. No. 4,020,036. The conjugated dienes contain from 4–12 carbon atoms per molecule such as 1,3-butadiene, isoprene, and the like;
   b. epihalohydrin monomer(s), or a copolymer of an epihalohydrin monomer(s) with an oxide monomer(s) having a number average molecular weight (Mn) which varies from about 800 to about 50,000 as described in U.S. Pat. No. 4,101,604;

c. chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471;

d. hydrocarbon polymers including ethylene/propylene dipolymers and copolymers of ethylene/propylene and at least one nonconjugated diene, such as ethylene/propylene/hexadiene terpolymers and ethylene/propylene/1,4-hexadiene/norbornadiene, as described in U.S. Pat. No. 4,161,471;

e. conjugated diene butyl elastomers, such as copolymers consisting of from 85 to 99.5% by weight of a $C_4$–$C_7$ is olefin having 4 to 14 carbon atoms, copolymers of isobutylene and isoprene where a major portion of the isoprene units combined therein have conjugated diene unsaturation as described in U.S. Pat. No. 4,160,759.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

Experimental Section

Description of Material

1. Unsaturated Polyester Resin-1 is a polyester resin that is manufactured by North American Rockwell and sold under the trade designation of NR-3529. It is the condensation product of maleic anhydride and propylene glycol and contains approximately 35 weight percent of styrene.

2. Unsaturated Polyester Resin-2 (alkyd) is a polyester resin in which the the alkyd portion of an unsaturated polyester resin/styrene solution is a resin produced by Freeman Chemical as Stypol 40-2955. This alkyd is based on 0.25 moles of isophthalic acid, 0.75 mole of maleic anhydride and 1.10 moles of propylene glycol.

3. Unsaturated Polyester Resin-3 is the resin of unsaturated polyester resin-2 in its commercial form containing approximately 35 weight percent of styrene.

4. Unsaturated Polyester Resin-4 is a polyester resin based on the condensation product of maleic anhydride and propylene glycol and containing approximately 37 weight percent of styrene monomer which is sold by Owens Corning Fiberglass as CX-1652.

5. Poly(vinyl ethyl ether)-1 is a poly(vinyl ethyl ether) having a molecular weight of about 2,000,000.

6. Poly(vinyl ether)-2 is a poly (vinyl ethyl ether) polymer of approximate molecular weight of $\overline{M}_n$—40,000, $\overline{M}_w$—150,000. It is sold by BASF as Lutanol™ A-50.

7. Poly(vinyl ether)-3 is a poly (vinyl isobutyl ether) polymer of approximate molecular weight of $\overline{M}_n$—10,000, $\overline{M}_w$—23,000. It is sold by BASF as Lutanol™ I-30.

8. Poly(vinyl ether) Polymer-4—a poly (vinyl isobutyl ether) polymer of approximate molecular weight of $\overline{M}_n$—22,000, $\overline{M}_w$—300,000. It is sold by BASF as Lutanol™ I-60.

9. "Polystyrene" is a rubber modified material manufactured by Union Carbide as LPS-80 for use as a shrink control additive.

10. Poly (methyl methacrylate) is a carboxyl containing polymer manufactured by Rohm and Haas as P-701 for use as a shrink control additive.

11. Poly (vinyl acetate)-1 is a carboxyl containing vinyl acetate polymer manufactured by Union Carbide as LP-40A for use as a shrink control additive.

12. Ethylene-Vinyl Acetate Copolymer-1 is a 40 weight percent ethylene—60 weight percent vinyl acetate copolymer manufactured by IGF Bayer AG as Levapren™ 450.

13. Al-Sil-Ate LO is a clay filler from Freeport-Kaolin.

14. ASP-400 is a clay filler from Engelhard.

15. L-256 is a peroxide catalyst from Lucidol.

16. Zelec UN is a mold release agent from DuPont.

17. OCF 498AA is a chopped fiberglass manufactured by Owens Corning Fiberglass.

18. PPG 303 is a chopped fiberglass manufactured by PPG Industries.

19. PPG 3075 is a chopped fiberglass manufactured by PPG Industries.

20. Black pigment dispersion-1 is a carbon black dispersion at about 30 weight percent sold by Plasticolors, Inc. as CM-2015.

21. MgO Dispersion-1 is a magnesium oxide dispersion at about 33 weight percent is an unsaturated polyester carrier resin sold by USS Chemicals as Modifier M.

22. Hydrated alumina is Alcoa C-331 grade.

General Procedure for Preparation of Bulk Molding Compound (BMC) Formulations

All the liquid components were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3–5 minutes. The agitator was then stopped and the internal mold release agent and/or fatty acid was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent, if desired, was mixed into the paste over a period of 2–3 minutes, the mixer was again stopped and 175 grams of the paste were removed from the pan (using a large spatula) and transferred to a wide-mouthed 4 oz. bottle. This paste sample was stored in the capped bottle at room temperature and the viscosity was measured periodically using a Model HBT 5X Brookfield Synchro-Lectric Viscometer on a Helipath Stand.

After removal of the paste sample, the contents were reweighed and styrene loss made up, the chopped glass fibers were added slowly (from an ice cream carton) to the paste with the mixer running on slow speed. The mixer was run for approximately 30 seconds after all the glass was in the paste. This short time gave glass wet without glass degradation. The pan was then removed from the mixer and separate portions of the BMC mix of a appropriate amount were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached molding viscosity is chemically thickened. The weight of the BMC added to the foil varies with the molding application.

Molding

Flat panels 18 inches×18 inches of varying thickness were molded using an extremely smooth, highly polished matched metal die set of chrome plated molds. Both platens are oil heated separately to allow for varying temperature. The molding was conducted in a 200 ton press and the panel removed with the aid of ejector pins. A standard molding temperature is 300°–305° F. (149°–152° C.) at pressures of 500 or 1000 psi. Laminate thicknesses are typically 0.10 and 0.125 inches, Method of Shrinkage Measurement A 18"×18"×0.125" flat panel is molded in a highly polished chrome plated matched metal die mold in a 200 ton press. The exact dimensions of the four sides of this mold are measured to the ten-thousandths of an inch at room temperature. The exact length of the four sides of the flat molded panel is also determined to the ten-thousandths of an inch. These measurements are substituted into the equation below:

$(a-b)/a$=inch/inch shrinkage inch/inch shrinkage×1000=mils/inch shrinkage $a$=the sum of the lengths of the four sides of the mold $b$=the sum of the lengths of the four side of the molded panel A positive (+) number recorded indicates and expansion of the molded part as measured at room temperature compared to the dimensions of the mold measured at room temperature. A negative (−) number indicates shrinkage by the same comparison. The larger the positive number the better the performance.

Transfer Molding

The transfer molding was accomplished by charging the BMC to a ram and injecting into the "tree mold" as outlined in FIG. 1. The tree mold for the transfer press utilizes a 100 ton press, 800 PSI ram pressure, and 180 gram molding charge. Shrinkage was measured by measuring one of the 4 inch bars with microcalipers and comparing this bar length to that of the bar length of the mold both measured at room temperature. Pigmentation was judged on the bars as well as the two circular discs. In FIG. 1, (2) (½ in.×⅛ in.) is used as a tensile bar for tensile measurements and for measuring shrinkage, (3) (4 in.×½ in.×¼ in.) and (8) (4 in.×½×¼ in.) are impact bars for measuring impact strength and for measuring shrinkage, (9) (2 in.×⅛ in.) is used for evaluating surface profile, and (10) (4 in.×⅛ in.) is used to evaluate surface profile, pigmentation and impact measurements. In the Figure (5) and (6) depict feed lines and (4) and (7) depict gates on the test apparatus.

MCR

This is a measure of surface smoothness and was determined using a Bendix microrecorder profilometer. A diamond stylus is passed over a molded panel and the stylus moves up and down the peaks and valleys of the surface. The lower the number the better. Automotive grade steel measures approximately 200.

EXAMPLE 1

The following formulation was combined.

| | PBW |
|---|---|
| Unsaturated Polyester Resin-1 | 40 |
| 35% Poly(vinyl ethyl ether)-1 in styrene | 18 |
| Al-Sil-Ate Lo | 39 |
| Styrene | 3 |
| t-butylcatecol | 300 ppm |

| | PBW |
|---|---|
| Lupersol 256 | 0.5% |
| Zelec UN | 0.5% |
| Fiberglass mat (1" random) with 10 mil veil (wt. %) | 30 |

The ingredients, except for the fiberglass, were mixed to a smooth paste consistency on a Cowles dissolver, then poured on the fiberglass mat and molded in a 12 inch×12 inch matched metal die mold for 3 minutes at 149° C. and 500 psig.

The resulting molding (0.10–0.11 inches in thickness) had and MCR value of 162. A molding containing no poly(vinyl ethyl ether) had an MCR value of 1200.

EXAMPLES 2 THROUGH 6

The following BMC formulation was used to examine the performance of poly(vinyl ethers) as shrinkage control additives to fiber reinforced unsaturated polyester molding compounds.

| | PBW |
|---|---|
| Unsaturated Polyester Resin2 (alkyd) | 40.2 |
| Thermoplastic Shrinkage Control Additive | 12.0 |
| Styrene | 47.8 |
| Calcium Carbonate (5 Micron Average Particle Size) | 150 |
| Hydrated Alumina | 50 |
| Clay (ASP-400) | 38 |
| Zinc Stearate | 4 |
| Black Pigment Dispersion-1 | 12 |
| t-Butyl Perbenzoate | 1.2 |
| p-Benzoquinone | 0.03 |
| Glass (¼ inch Fibers) OCF-498AA | 20 wt. % |

The unsaturated polyester alkyd, thermoplastic shrinkage control additive and styrene were introduced as styrene solutions. The polyester resin contained about 35 weight percent of styrene and the thermoplastics were used at 35–40 weight percent solutions in styrene. When mixtures of thermoplastics are given they are used at 50/50 mixtures in the 12 parts of thermoplastic in the formulation.

These materials are all molded in a transfer press into a tree mold as previously described. Cure conditions in all cases was 2.5 minutes at 300° F. Approximately 180 grams of charge was used for each molding. Ram pressure to inject the BMC was about 800 psig. Each material was evaluated for shrinkage control and pigmentability.

| Example | Thermoplastic Shrink Control Additive | Pigmentation Rating | Shrinkage Control (mils/inch) |
|---|---|---|---|
| 2 | Polystyrene | Fair 3 | −2.0 |
| 3 | Poly(vinyl ethyl ether)-1 | Good 2 | +0.2 |
| 4 | Poly(vinyl acetate)-1 | Bad 5 | 0.0 |
| 5 | Poly(methyl methacrylate)-1 | Bad 5 | −1.6 |
| 6 | Poly styrene/poly(vinyl ethyl ether) | Fair 2.5 | 0.0 |

The pigmentation rating scale is from 1 (very good) to 5 (very bad).

EXAMPLES 7 THROUGH 9

The following BMC formulation was used to evaluate poly(vinyl ethers) as shrinkage control additives.

| Parts By Weight | | | |
| --- | --- | --- | --- |
| | 7 | 8 | 9 |
| Unsaturated Polyester-3 | 58 | — | — |
| Unsaturated Polyester-1 | — | 58 | 58 |
| 40% Poly(vinyl acetate-1) in styrene | — | — | 30 |
| Poly(vinyl ethyl ether-1) 38% in styrene | 42 | 42 | — |
| Styrene | — | — | 12 |
| Calcium Carbonate (2.5 micron average particle size) | 150 | 150 | 150 |
| Hydrated Alumina | 50 | 50 | 50 |
| Clay (ASP-400) | 38 | 38 | 38 |
| Zinc Stearate | 2 | 4 | 4 |
| Black Pigment Dispersion-1 | 14 | 14 | 14 |
| t-Butylperbenzoate | 1.2 | 1.2 | 1.2 |
| p-benzoquinone | 0.03 | 0.03 | 0.3 |
| MgO dispersion-1 (33%) | 2.5 | 3.0 | 2.0 |
| Glass (¼# inch fibers) wt. % PPG-303 | 20 | 20 | 20 |

These materials were left standing for several days to chemically thicken them and then the chemically thickened materials were molded on the same equipment as Examples 2 through 6. Curing conditions were 149° C. for two minutes using a 180 gram charge and ram pressure of 800 psi.

In this case the shrinkage control was judged by measuring the length of one of the bars from the tree mold with microcalipers. The longer the bar the better the shrinkage control. Pigmentation was judged as above on a scale of 1 to 5 with 1 being very good and 5 being very bad.

| Example | Bar Length (inches) | Pigmentation Rating |
| --- | --- | --- |
| 7 | 4.987 | 1 |
| 8 | 4.988 | 1 |
| 9 | 4.986 | 3 |

The bar lengths indicate essentially equal shrinkage control between the materials. However, the poly(vinyl ether) yields good pigmentation with two different resin structures.

EXAMPLES 10 THROUGH 14

The following BMC formulations were made for evaluation of thermoplastic shrinkage control additives.

| Parts by Weight | | | | | |
| --- | --- | --- | --- | --- | --- |
| | 10 | 11 | 12 | 13 | 14 |
| Unsaturated Polyester-4 | 53 | 53 | 53 | 53 | 53 |
| Ethylene-Vinyl Acetate Copolymer-1 at 35 weight percent in styrene | 42 | 31.5 | 31.5 | 31.5 | — |
| Poly(vinyl ether)-2 40% in styrene | — | 10.5 | — | — | — |
| Poly(vinyl ether)-2 40% in styrene | — | — | 10.5 | — | — |
| Poly(vinyl ether)-4 40% in styrene | — | — | — | 10.5 | — |
| Poly(vinyl acetate-1) 40% in styrene | — | — | — | — | 42 |
| Styrene | 5 | 5 | 5 | 5 | 5 |
| t-Butyl Perbenzoate | 1.5 | 1.5 | 1.5 | 1.5 | 1.5 |
| t-Butyl Peroctoate (50%) | 0.5 | 0.5 | 0.5 | 0.5 | 0.5 |
| 5% p-benzoquinone in diallyl phthalate | 0.4 | 0.4 | 0.4 | 0.4 | 0.4 |
| Black pigment dispersion-1 | 8.0 | 8.0 | 8.0 | 8.0 | 8.0 |
| Zinc Stearate | 2 | 2 | 2 | 2 | 2 |
| Calcium Stearate | 2 | 3 | 2 | 2 | 2 |
| Calcium Carbonate (2.5 micron average particle size) | 230 | 230 | 230 | 230 | 230 |
| Fiberglass (¼ inch) wt. % PPG-3075 | 20 | 20 | 20 | 20 | 20 |

These formulations were molded on an 18 inch by 18 inch chrome plated matched metal die mold in a 200 ton Lawton hydraulic press. Molding conditions were 300° F. for 2 minutes at 1000 psi pressure. Shrinkage control evaluations are shown below. Values listed as "+" indicate expansion as the part is measured at room temperature and compared to the room temperature dimensions of the mold.

| | 10 | 11 | 12 | 13 | 14 |
| --- | --- | --- | --- | --- | --- |
| Shrinkage (mils/inch) | +0.166 | +0.138 | +0.222 | +0.208 | +0.166 |

Pigmentation ratings showed Examples 11, 12 and 13 to be more uniform than Example 10 with Example 14 being the worst.

EXAMPLE 15

Using a formulation identical to that in Examples 10 through 14, 42 parts of a 40% solution of poly(vinyl ether)-4 in styrene was used as the sole thermoplastic shrinkage control additive. When molded as those examples, an essentially zero shrinkage panel was obtained with very good pigmentation.

I claim:

1. A polyester-based molding composition, comprising:

a) an unsaturated polyester resin;

b) an olefinically unsaturated monomer that is copolymerizable with said unsaturated polyester resin;

c) a pigment;

d) fiber reinforcement; and e) a poly(vinyl ether) polymer which is effective to control shrinkage of the molding composition and to promote uniform distribution of said pigment in the molding composition;

said poly(vinyl ether) polymer having a weight average molecular weight of at least 50,000 and being selected from the group consisting of:

1) homopolymers of vinyl ethers of formula $CH_2=CHOR$; and 2) copolymers of vinyl ethers of formula $CH_2=CHOR$ and olefins of formula $R'CH=CHR''$, in which at least 50 mole percent of the repeating units of said copolymers are derived from vinyl ether; and wherein:

R in each repeating unit containing an R moiety is independently selected from the group consisting of:

alkyl of 1–18 carbon atoms;
cycloalkyl of 3–8 carbon atoms;
phenyl;
alkylcycloalkyl having 1–8 carbon atoms in the alkyl moiety thereof; and
alkylphenyl having 1–8 carbon atoms in the alkyl moieties thereof; and
R' and R" in each repeating unit containing these moieties are independently selected from the group consisting of:
hydrogen;
alkyl of 1–12 carbon atoms;
phenyl;
acyloxy;
alkoxycarbonyl;
hydroxyalkoxycarbonyl;
oxy;
hydroxyl; and
carboxyl.

2. The molding composition of claim 1 wherein the fiber reinforcement comprises glass fibers or fabrics, carbon fibers or fabrics, aramide fibers or fabrics, asbestos fibers or fabrics, polypropylene, acrylonitrile/vinyl chloride copolymers, polyacrylonitrile fibers or fabrics.

3. The molding composition of claim 2 wherein the fiber reinforcement comprises fiberglass.

4. The molding composition of claim 1 wherein the fiber reinforcement comprises carbon fiber.

5. The molding composition of claim 1 wherein the fiber reinforcement comprises aramide fiber.

6. The molding composition of claim 1 wherein the unsaturated polyester comprises a vinyl ester resin.

7. The molding composition of claim 1 wherein said poly(vinyl ether) polymer comprises repeating units derived from vinyl ethyl ether.

8. The molding composition of claim 1 wherein said poly(vinyl ether) polymer comprises repeating units derived from vinyl isobutyl ether.

9. The molding composition of claim 1 containing filler, peroxide catalyst, and mold release agent.

10. The molding composition of claim 1 containing a chemical thickening agent.

11. The molding composition of claim 1 in which the poly(vinyl ethers) are used in conjunction with other shrinkage control additives.

12. The molding compositions of claim 1 wherein poly(vinyl ethers) contain at least one of carboxyl or hydroxyl groups bonded thereto.

13. A molded article made from the molding at elevated temperatures of the molding composition of claim 1.

* * * * *